United States Patent
Hall, IV et al.

(10) Patent No.: US 8,111,610 B2
(45) Date of Patent: Feb. 7, 2012

(54) FLAGGING OF PORT CONDITIONS IN HIGH SPEED NETWORKS

(75) Inventors: Calvin Spring Hall, IV, Costa Mesa (CA); David Alexander Neufeld, Costa Mesa (CA); Robert Carl Crepps, Costa Mesa (CA); Donivan Ross Ortgies, Costa Mesa (CA)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 104 days.

(21) Appl. No.: 12/020,059

(22) Filed: Jan. 25, 2008

(65) Prior Publication Data
US 2009/0190476 A1 Jul. 30, 2009

(51) Int. Cl.
*H04L 12/00* (2006.01)

(52) U.S. Cl. ......... 370/216; 370/236; 370/242; 370/463

(58) Field of Classification Search ............... None
See application file for complete search history.

(56) References Cited

U.S. PATENT DOCUMENTS

| 5,761,424 | A * | 6/1998 | Adams et al. | 709/217 |
|---|---|---|---|---|
| 5,944,798 | A * | 8/1999 | McCarty et al. | 709/251 |
| 6,201,787 | B1 * | 3/2001 | Baldwin et al. | 370/222 |
| 6,502,189 | B1 * | 12/2002 | Westby | 713/1 |
| 6,553,036 | B1 * | 4/2003 | Miller et al. | 370/462 |
| 6,643,693 | B1 * | 11/2003 | Reynolds et al. | 709/223 |
| 7,590,046 | B1 * | 9/2009 | Bhate et al. | 370/216 |
| 2002/0046276 | A1 * | 4/2002 | Coffey et al. | 709/224 |
| 2004/0085972 | A1 * | 5/2004 | Warren et al. | 370/401 |
| 2004/0085994 | A1 * | 5/2004 | Warren et al. | 370/462 |
| 2008/0126616 | A1 * | 5/2008 | Kumasawa et al. | 710/42 |
| 2009/0041057 | A1 * | 2/2009 | Dickens et al. | 370/470 |

* cited by examiner

*Primary Examiner* — Robert Scheibel
(74) *Attorney, Agent, or Firm* — Morrison & Foerster LLP

(57) ABSTRACT

A non-intrusive condition flag is introduced into high-speed data network for flagging a fault condition without interrupting the normal operation of the network. The condition flag is chosen to be one that is relatively not germane with respect to disrupting the behavior of the ports under a particular network protocol, or that is normally ignored by the network ports and/or devices. The non-intrusive condition flag can be in the form of a marker represented by designating new, currently undefined, Ordered Sets that would not cause the ports to disrupt network behavior. The marker is represented by repeating the same designated Ordered Set twice in sequence, to give the marker fault tolerance and prevent re-transmission. Ordered Sets may be chosen to identify a segment stall condition, a port busy condition, or a user defined condition in a FC network.

22 Claims, 4 Drawing Sheets

FLAGGING OF PORT CONDITIONS IN HIGH SPEED NETWORKS

FIELD OF THE INVENTION

This invention relates to storage network systems, and more particularly to flagging port conditions in high-speed data network systems.

BACKGROUND OF THE INVENTION

All publications referenced herein are fully incorporated by reference as if fully set forth herein.

DESCRIPTION OF RELATED ART

In information exchange networks, data transfer among network devices may be based on a number of available protocols. Network devices may include computer systems (e.g., workstations, servers, etc.), peripheral devices (e.g., mass storage systems, input/output systems, etc.), switches, and other general function or function specific systems and devices. The network devices communicate via data transfer protocols in accordance with several established industry standards, such as Fibre Channel (FC), Internet Small Computer Systems Interface (iSCSI), Ethernet, etc.

FC data transfer protocol is a gigabit-speed network protocol (e.g., operating on the order of 1 to 10 Gbits/s or higher), which has been effectively adopted for Storage Area Networks (SANs), connecting servers and storage systems at a plurality of ports within the network. A port in FC terminology is any entity that actively communicates over the network, not necessarily a hardware port. A port is usually implemented in a device such as a disk storage device, a host bus adaptor (HBA) on a server or a FC switch.

FC supports three different topologies, Point-to-Point (FC-P2P), Fabric Attached or Switched (FC-SW), and Arbitrated Loop (FC-AL). The FC-P2P topology attaches two devices directly. The FC-SW topology attaches a device directly to a switch fabric. The FC-AL topology attaches devices in a loop or ring.

Arbitrated Loop has become the most dominant FC topology. While it is a cost-effective way of connecting multiple ports in a single network without the need of a fabric switch, it is also the most complex among the FC topologies. Unlike the other two topologies, the media is shared among the devices, limiting each device's access. For a Loop to operate, all devices must be Loop devices.

In FC, Ordered Sets are used to distinguish FC control information from data, which may include a frame delimiter, a primitive signal, or a primitive sequence. Many Ordered Sets are constantly going around the Loop. For example, when a device is ready to transmit data in an Arbitrated Loop, it first must arbitrate and gain control of the Loop. Once the device has gained control of the Loop, it can communicate with other devices by transmitting an Open (OPN) Primitive Signal to a target device on another port, opening communication with that device on the Loop. Once this happens, there essentially exists point-to-point communication between the two devices. All other devices in between simply repeat the data.

In the FC-AL topology, because all devices are in a loop or ring, failure of one device could cause all activity on the loop to be interrupted. Specifically, before an Arbitrated Loop is usable, it must be initialized. Loop initialization generally involves transmission of a Loop Initialization Primitive Sequence (LIP). LIP is transmitted by a FC port (often referred to as an L_Port) after it powers on. However, in the past, LIP is also transmitted by a FC port when it detects a fault at a port. In such circumstance, the LIP will propagate around the Loop, triggering all other ports to transmit LIP as well. Each and every port on the Loop needs to be re-initialized. At this point, the entire Loop network would be down, causing the Loop to be unusable. The LIP flag transmitted in the event of a port condition is therefore disruptive to the operation of the entire Loop.

Further, under FC-AL topology, in the event of a port condition, it can be difficult to pin-point the source of such condition by probing the network wiring. For relatively low data transmission bandwidth (e.g., less than 1 Gbits/s), the port condition is not difficult to identify. However, for relatively higher data transmission bandwidth (e.g., at 2 to 10 Gbits/s or higher), it would be challenging to identify port condition. While current tools such as analyzers have made it easier to capture, filter and trigger information related to port conditions, for certain port conditions, it is still difficult to identify the source on an analyzer trace. Due to the difficulty of locating port conditions on a trace, extra resources are required to be spent in the field during network diagnostics and in laboratories during network development, analyzing large amounts of data to determine when a fairly simple port condition occurred. The issues with identifying port conditions have been further discussed in published international patent application no. PCT/US99/26924 (PCT Publication No. WO00/30293), which has been commonly assigned to the assignee of the present application.

Emulex's InSpeed technology is an advanced switching architecture comprising a non-blocking crossbar switch with unique loop port logic resulting in a single chip capable of handling multiple FC devices in embedded SOC (switch-on-a-chip), blade and box environments. InSpeed technology provides tools advancing reliability, availability, serviceability and scalability, e.g., diagnostics capabilities that can be used to maintain and troubleshoot back-end storage systems, which improves storage reliability. InSpeed, through its RAS capability, has the ability to detect port conditions such as port busy conditions and detect and correct segment stalls. However, the existing InSpeed technology does not have an effective way of flagging port conditions.

It is therefore desirable to provide flagging of port conditions in network systems operating at high-speed network data transfer protocols.

SUMMARY OF THE INVENTION

The present invention is directed to a system and method for flagging port conditions in a high-speed network. In a basic aspect of the present invention, a non-intrusive condition flag is introduced into the data network for tracing the condition without interrupting the normal operation of the network. Flagging as used in the context of the present invention includes identifying the port condition and/or the source of such condition. The condition flag is chosen to be one that is relatively not germane with respect to the control (e.g., initialization) of ports under a particular network protocol, or that is normally ignored by other network ports and/or devices, except for those ports programmed or enabled to recognize the flag, e.g., by the API that controls switch ASIC.

In one embodiment of the present invention directed to FC-AL network, the non-intrusive condition flag is in the form of a marker represented by currently undefined Ordered Sets that would not cause the ports to disrupt network behavior. In one embodiment, Ordered Sets may be chosen to identify a segment stall condition requiring a close [CLS] and remove connect operation, a port busy condition requiring a close [CLS] operation by the switch, or a particular user defined condition in a FC network.

BRIEF DESCRIPTION OF THE DRAWINGS

For a better understanding of the present invention, as well as the best mode, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention can find utility in a variety of implementations without departing from the scope and spirit of the invention, as will be apparent from an understanding of the underlying principles. By way of examples and not limitation for purposes of describing the inventive aspects of the present invention, references are made throughout this description of the invention to a FC-AL network environment, and in particular a storage area network (SAN). However it is understood that the present invention may be extended to be applied to other high speed networks operating under other network protocols and/or multi-protocol network environments, without departing from the scope and spirit of the present invention.

System Overview

Figure 1:
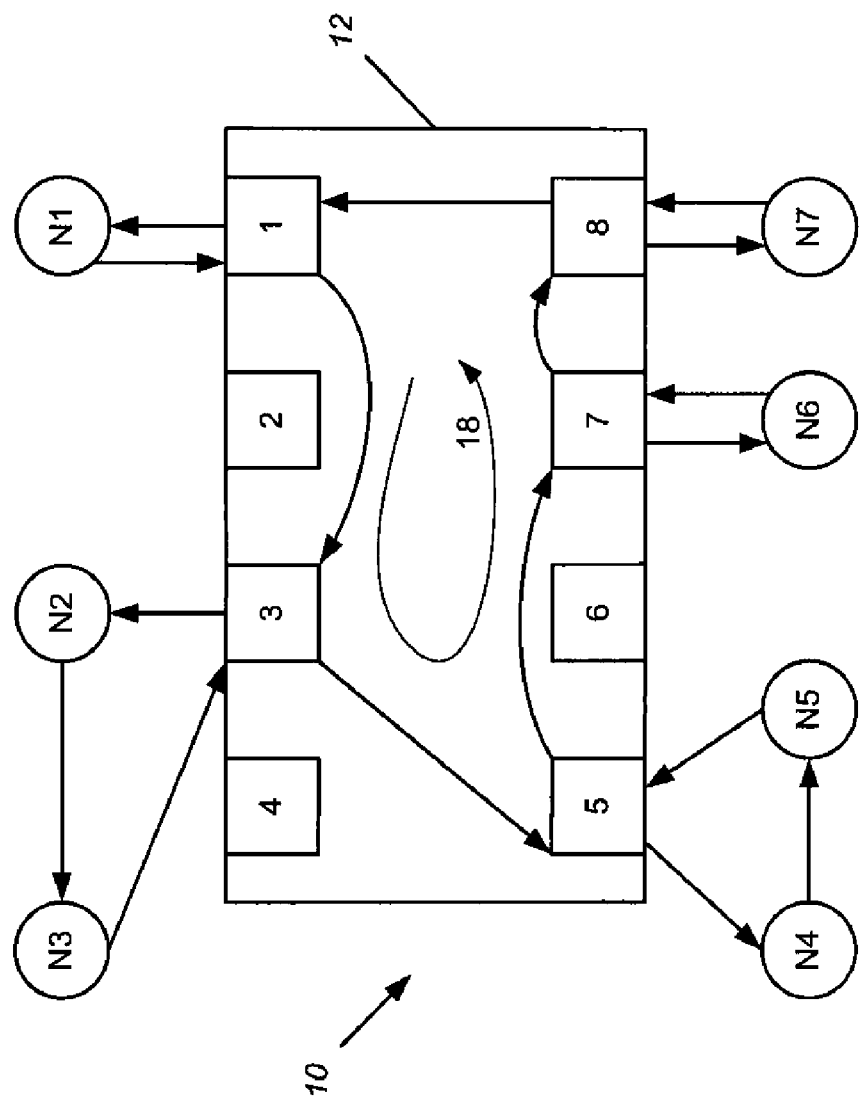
FIG. 1 is a schematic diagram of devices interconnected in a Fibre Channel Arbitrated Loop including a Loop Switch implementing a condition flag, in accordance with one embodiment of the present invention.

FC-AL networks are well documented in the state of the art. FIG. 1 is a schematic diagram illustrating an embodiment of a FC-AL network 10 that deploys the condition flag in accordance with the present invention. The FC-AL standard defines a topology that allows many network devices to be connected together in a ring configuration. Each device has a transmitter and a receiver. The transmitter of one device is connected to the receiver of another device and so on, until the last device's transmitter is connected back to the first device's receiver. In the illustrated embodiment, the FC-AL network 10 includes Nodes N1 to N7 at which devices are located, and a switch 12 having Ports 1 to 8 to which the nodes are connected. Some ports have more than one node connected to them. The interconnection between devices may be direct or via the ports in the switch 12. The switch 12 effectively connects the ports in a ring configuration. In the illustrated embodiment, Ports 1, 3, 5, 7 and 8 are electronically and/or logically interconnected in a sequence in a ring, with Port 8 connected back to Port 1, as schematically shown in FIG. 1. Accordingly, via the Ports 1, 3, 5, 7 and 8, the Nodes N1 to N7 are connected in a ring configuration to form the Arbitrated Loop 18.

The FC-AL network 10 may support data communication based on one or more protocols in accordance with different established network data transfer standards or architectures, and may include separate and/or interconnected sub-networks that support one or more data transfer protocols. In one aspect of the present invention, the supported protocols comprise storage level protocols (e.g., for SANs).

Figure 2:
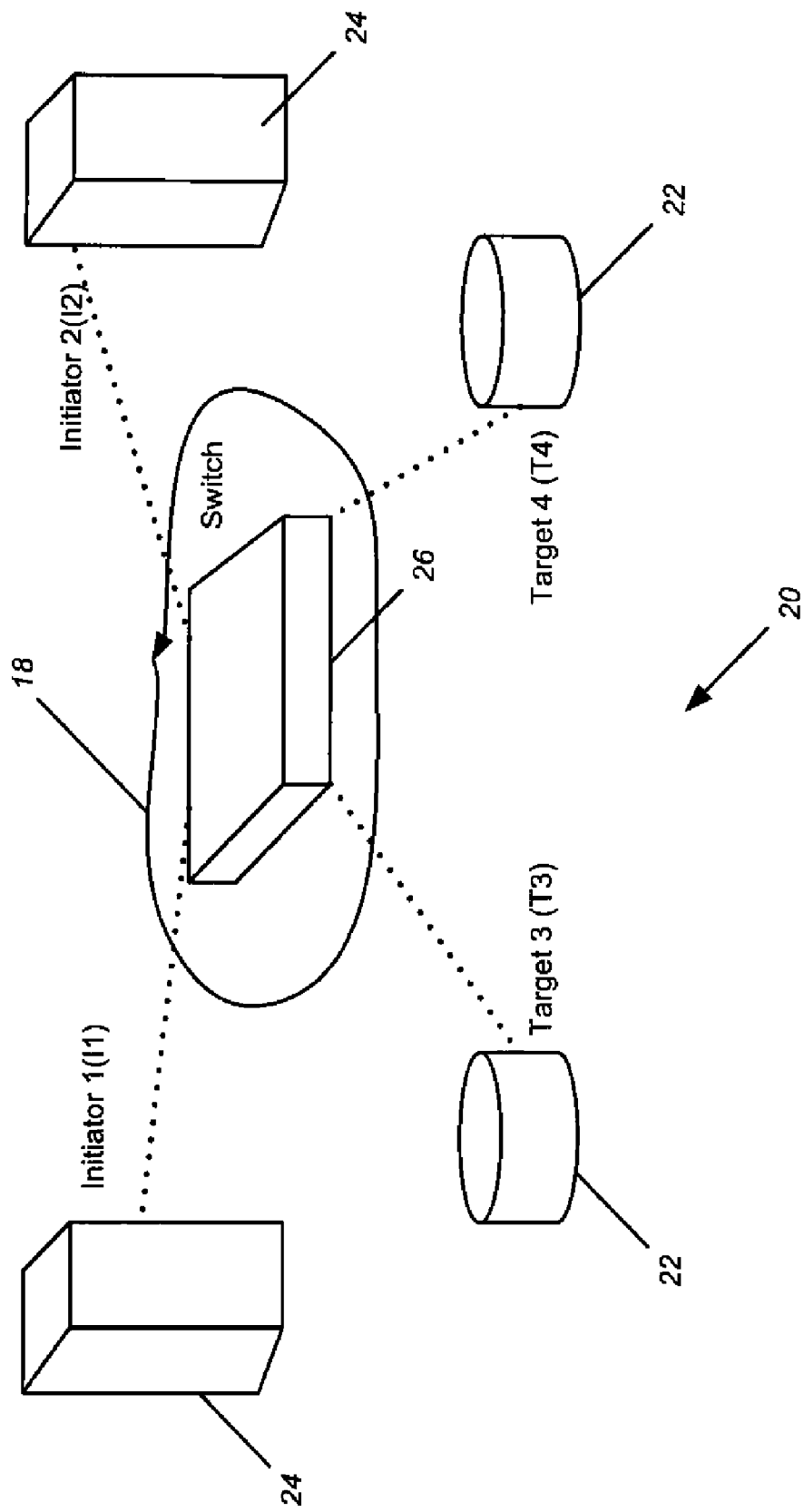
FIG. 2 is a schematic diagram of a storage area network implementing a condition flag, in accordance with one embodiment of the present invention.

FIG. 2 schematically illustrates an embodiment of SAN 20 implemented in a FC-AL network similar to the FC-AL network shown in FIG. 1. The FC-AL network 10 generally includes a number of network devices such as storage devices 22 and servers 24, which communicate over an Arbitrated Loop 18. In a SAN, the network devices would include storage devices 22 and servers 24. In the context of the illustrated SAN 20, the storage devices are "Targets" and the servers 24 are "Initiators" in the FC-AL network. The servers 24 may include RAID controllers. The storage devices 22 may include hard drives, tape drives and optical drives, etc., configured as, for example, redundant array of independent disks (RAID), part of larger systems such as servers, a combination of the foregoing, or standalone systems. The SAN network 20 may include, or is part of, the Internet, a proprietary local area network, a wide area network, telecommunications networks, broadcast networks, wired or wireless networks, etc., and may include a combination of some or all of the foregoing.

Details of various hardware and software components comprising the SAN 20 and/or FC-AL network are not shown in the figures (such as additional switches, hubs, routers, gateways, switches, etc.) as they are known in the art. Further, it is understood that access to the SAN 20 by the network devices may be via physical transmission medium (e.g., optic fiber) suitable for the particular network data transfer protocols supported by the network devices.

InSpeed Technology

Referring to FIG. 2, for purpose of illustration and not limitation of the present invention, the SAN 20 is configured to include a Switch 26 that forms a part of the Arbitrated Loop 18, which switch incorporates the InSpeed™ technology developed by Emulex Corporation, the assignee of the present invention. (The Switch 26 corresponds to the switch 12 in FIG. 1.) Emulex's InSpeed technology is an advanced switching architecture comprising a non-blocking crossbar switch with unique loop port logic resulting in a single chip capable of handling multiple FC devices in embedded SOC (switch-on-a-chip), blade and box environments. InSpeed technology provides tools advancing reliability, availability, serviceability and scalability, e.g., diagnostics capabilities that can be used to maintain and troubleshoot back-end storage systems, which improves storage reliability. The details of the InSpeed technology will not be discussed herein so as not to obscure the disclosure of the present invention, but will only be discussed where appropriate below to the extent to provide an embodiment to facilitate a better understanding of the present invention. The InSpeed technology has been well documented, including, for example, the following publications: White Paper entitled "Improving Storage System Resiliency:

Stealth Intelligent Change Manager", author unknown (Emulex Publication No. 07-216, 10/06); While Paper entitled "Advancing Storage Reliability with InSpeed Technology", authored by Thomas Hammond-Doel, Director of Technical Marketing, October 2002 (Emulex Publication No. 04-170, 02/04); While Paper entitled "Introducing InSpeed Technology—Breaking New Cost/Performance Barrier in Storage Networking", authored by Thomas Hammond-Doel, Director of Technical Marketing, January 2002 (published by Vixel Corporation, which has been acquired by Emulex; Vixel Part #00045036-002 Rev. A); and the following patent publications by the assignee of the present invention: U.S. Pat. No. 6,118,776; U.S. Patent Application Publication No. US2002/0196773A1; U.S. Patent Application Publication No. US2003/0086377A1; U.S. Patent Application Publication No. US2003/0095549A1; U.S. Patent Application Publication No. US2004/0081187A1; International Patent Application Publication No. WO00/30293.

Initiator-Target Interaction

In the event an Initiator/server 24 wishes to open communication with a Target/storage device 22 in the Arbitrated Loop 18, an Initiator-Target interaction process is undertaken. Referring to the interaction diagram of FIG. 3, when the Initiator 24 is ready to access the Target 22 in the Arbitrated Loop 18, the Initiator 24 must first arbitrate and gain control of the Loop 18 via its L_Port, in order to open communication with another port on the Loop 18. Specifically, once the Initiator 24 has gained control of the Loop 18, it transmits via the L_Port that has won the arbitration process, an Open (OPN) Primitive Signal to the Target 22 on another port in the Loop 18 via the Switch 26, so as to open the L_Port at the Target 22. The Target 22 responds with a RRDYs Primitive Signal to the Initiator 24 via the Switch 26, to indicate that the Target 22 is ready to accept command or data from the Initiator 24. Communication is open between the Initiator 24 and the Target 22 at this time, where point-to-point communication essentially exists between the Initiator 24 and the Target 22. In particular, the Initiator 24 sends a FC frame command or data to the Target 22 via the Switch 26. All other network devices in between along the Loop 18 simply repeat the data/command between the Initiator 24 and the Target 22.

After which, under normal operations, the Initiator 24 should send via its L_Port, a Close (CLS) Primitive Signal to the Target 22, to close communication with the L_Port at the Target 22. This frees bandwidth along the Loop 18 for communications between other network devices. However, in the event the CLS is not sent by the Initiator 24, the interaction between the Initiator 24 and the Target 22 idles, waiting for the CLS. As a result, a segment stall condition occurs.

Condition Flag

In accordance with the present invention, the Switch 26 is configured to introduce a non-intrusive marker in the form of a condition flag into Loop 18 for tracing the fault condition without interrupting the normal operation of the FC-AL network. The condition flag is chosen to be one that is relatively not germane with respect to the control of initialization of ports under a particular network protocol, or that is normally ignored by other network ports and/or devices. In particular, in the embodiment directed to FC-AL network, the non-intrusive condition flag is in the form of a marker represented by currently undefined Ordered Sets that would not cause the ports to disrupt network behavior. In one embodiment, Ordered Sets may be chosen to identify a segment stall condition, a port busy condition, or a user defined condition in a FC-AL network.

Figure 4:
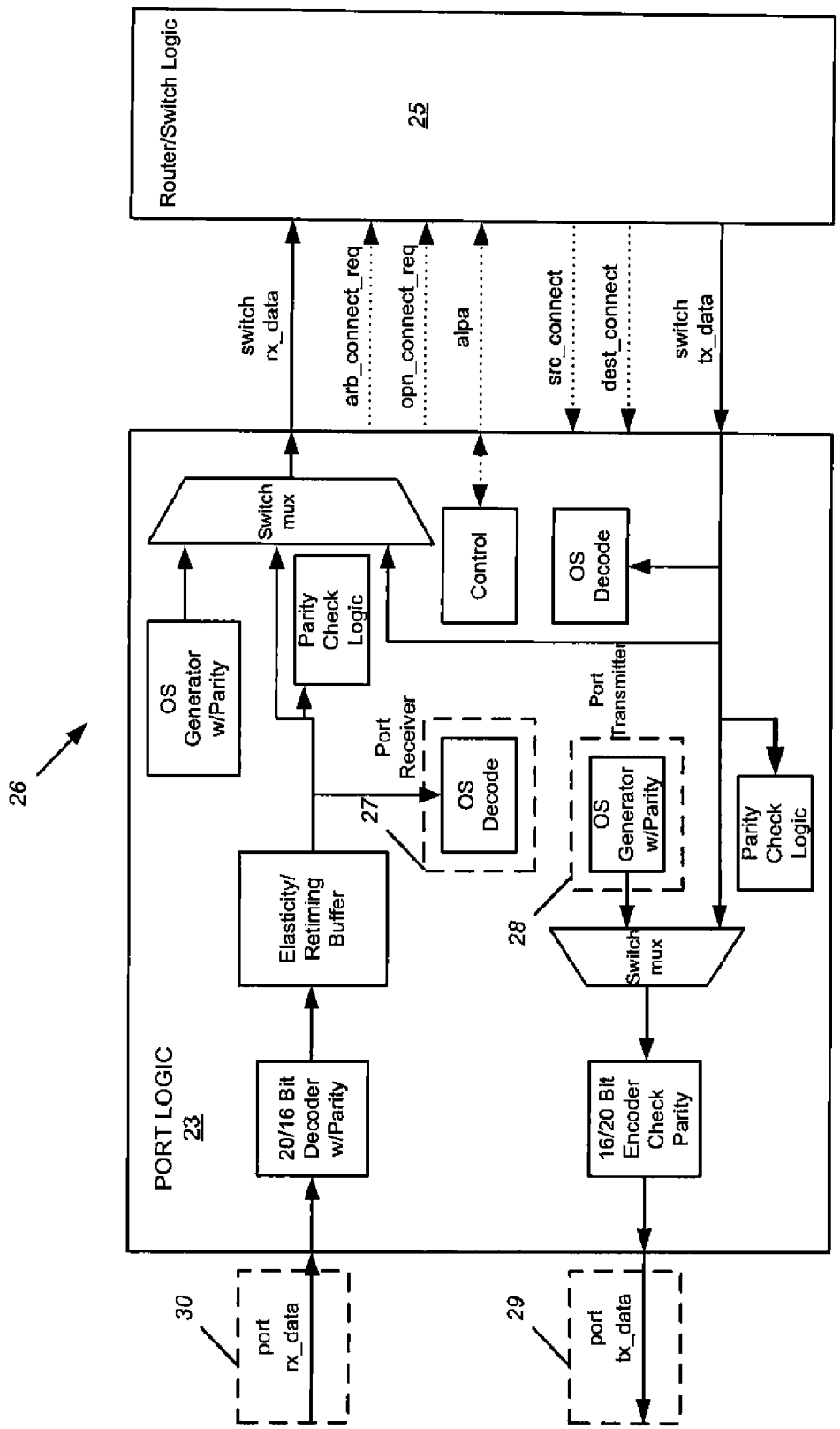
FIG. 4 is a schematic functional block diagram illustrating a high speed network switch that incorporates a port condition flagging capability in accordance with one embodiment of the present invention.

FIG. 4 schematically illustrates the functional components of the Switch 26, which may be an InSpeed switch that is enabled with the condition flag capability in accordance with the present invention. The Switch 26 comprises Port Logic 23 for controlling the Ports 1 to 8, and Switch Logic 25 for controlling routing or switching of the Ports. Only the components relevant to the discussion herein will be referenced. Further details of the Switch 26 may be referenced to published documentations of the InSpeed switch, which are fully incorporated by reference as if fully set forth herein. In the event of a port condition that is desirable to be flagged, OS Generator 28 in the Port Logic 23 of the Switch 26 generates the condition flag to the Transmitter 29.

Figure 3:
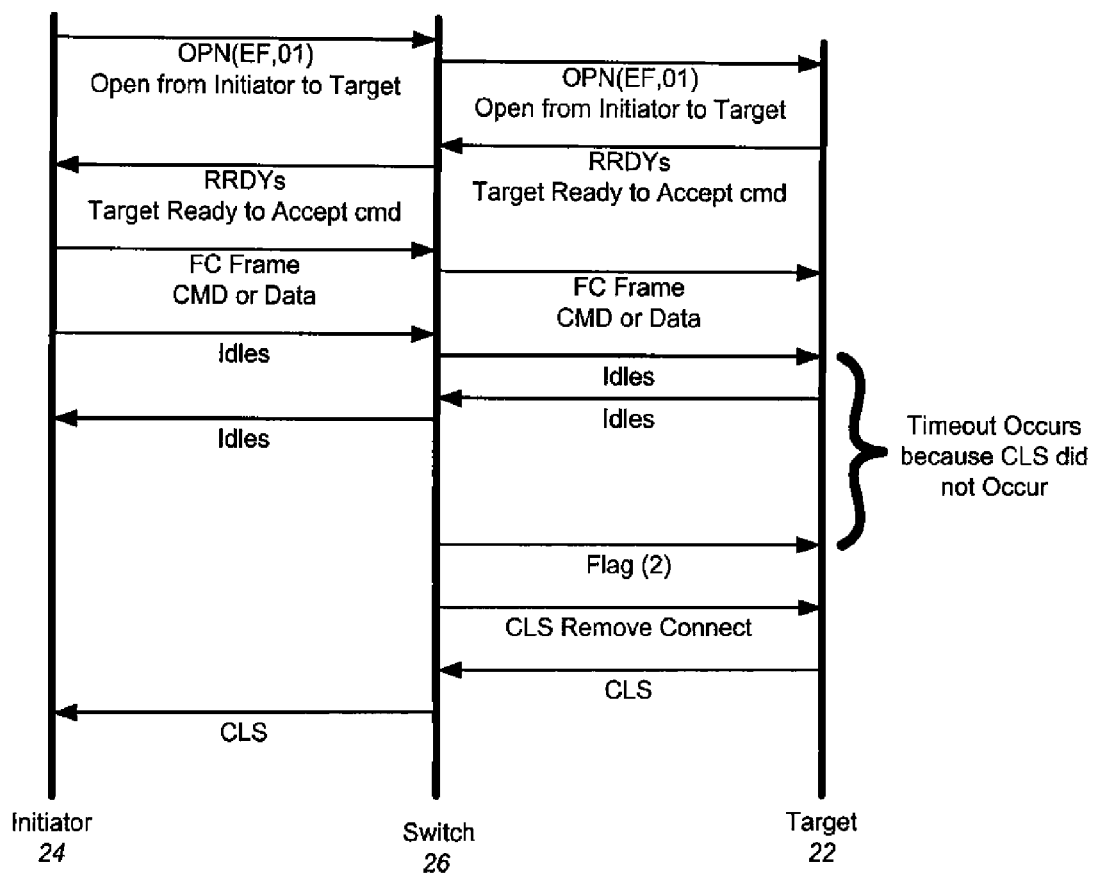
FIG. 3 is a schematic diagram illustrating the interaction of the devices in a Fibre Channel Arbitrated Loop implementing a condition flag, in accordance with one embodiment of the present invention.

In the event of a segment stall condition as described above, the condition flag may be chosen to identify the segment stall condition, which may be followed by a CLS and remove connect operation in the switch. Referring to FIG. 3, after a predefined timeout period in which CLS is expected from the Initiator but did not occur, the OS Generator 28 in the Port Logic 23 of the Switch 26 issues two Segment Stall Flag Ordered Sets followed by a CLS (as shown in FIG. 3) in sequence to the Target 22. The Target 22 responds by ignoring the flag and issuing a CLS Primitive Signal to the Initiator 24 via the Switch 26, to close communication with the L_Port at the Initiator 24.

As the Receiver 30 of the Port Logic 23 receives the flagged Ordered Sets, the Ordered Sets are detected by the OS Decode 27, which can be logged and will be removed and replaced with the current fill word in conformance to fibre channel protocol.

Port Condition Flagging

The condition flag markers are defined by two flag Ordered Sets, which are currently undefined Ordered Sets that are not germane to FC protocol, and which are normally ignored by routers and switches. By providing the condition flag marker in real time, the fault condition is flagged in real time, so it can be used for tracing the source of the fault condition in the network. The marker may be correlated to time information that is provided by the Application Programming Interface (API) of the Switch 26. By using the Ordered Sets twice in a row, they can be distinguished from an accidental flag situation, thereby error-tolerant. In one embodiment, when the condition flag is defined by the same Ordered Set only twice in sequence (as opposed to more than twice in sequence), retransmission can be prevented.

If the Initiator 24 that is experiencing the segment stall condition is Node N6 at Port 7 in FIG. 1, and the Target 22 in open communication with the Initiator 24 is Node N2 at Port 3, the marker (i.e., consisting of two Ordered Set flags in sequence) is transmitted to Target 22 by the switch core corresponding to Loop 18. By using Ordered Sets that are currently undefined, all attached nodes will ignore them per FC protocol, except for the nodes programmed to recognize such marker. If Nodes N2 and N3 otherwise recognize the marker defined by currently defined Ordered Sets, they can log and re-transmit the marker. The logged marker provides First Time Data Capture information for flagging the source of the port condition. If they do not recognize the marker, they will ignore it and not re-transmit it. Should Target 22 retransmits the condition flagged marker to another device at Node N3, and should that device at Node N3 retransmits the marker to Port 3 (i.e., Node 3 for some reason failed to follow protocol and retransmitted the marker comprising the condition flagged Ordered Sets), Port 3 will scrub the marker and not transmit it to the switch core (e.g., replace with the current fill word).

Other Condition Flags

In further embodiments, Ordered Sets may be chosen to represent condition flags to identify a target port busy condition, or a user defined condition in a FC-AL network. For example, a currently undefined Ordered Set may be chosen to define a Port Busy Flag, which is issued to the Target 22 twice in a row by the Switch 26 to represent a condition flag in the event an OPN is received by the Switch 26 for a port that is busy. A CLS is returned by the Target 22.

For a user defined condition, a currently undefined Ordered Set may be chosen to define a User Defined Flag, which is issued to the Target 22 twice in a row by the Switch 26 to represent a condition flag in the event a predefined error occurs, before resuming transmitting the current fill word.

The specific Ordered Sets can be chosen at the time of designing the specific ASIC structure for the switch.

The present invention has been described above in terms of schematic and functional diagrams. It is understood that unless otherwise stated to the contrary herein, one or more functions and components may be integrated in a single physical device with associated firmware and/or software control, or one or more functions and components may be implemented in separate physical devices with separate firmware and/or software control without departing from the scope and spirit of the present invention.

It is appreciated that detailed discussion of the actual implementation of each functional component is not necessary for an enabling understanding of the invention. The actual implementation is well within the routine skill of a programmer and system engineer with basic understanding of high-speed network design and various protocol specifications, given the disclosure herein of the system attributes, functionality and inter-relationship of the various functional components in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

What is claimed is:

1. A method of flagging a port condition in a network, said network comprising a plurality of ports communicating with each other in a ring configuration and operating in accordance with a high-speed network protocol, said method comprising:
    detecting a port condition associated with one of the plurality of ports, said port condition normally triggering a re-initialization of the plurality of ports in said network;
    generating a non-intrusive condition flag in response to said port condition, the non-intrusive condition flag identifying a source of the port condition; and
    sending the non-intrusive condition flag to each of the plurality of ports in the ring configuration to avoid the re-initialization of the plurality of ports in said network,
    wherein the non-intrusive condition flag is recognized by one or more enabled ports and ignored by other ports amongst the plurality of ports, said one or more enabled ports being notified of the source of the port condition from said non-intrusive condition flag.

2. The method as in claim 1, wherein the condition flag is defined in a manner that is not germane with respect to re-initialization of ports in the network under the network protocol.

3. The method of claim 1, wherein the condition flag is error-tolerant by repeating the same ordered set in sequence.

4. The method of claim 3, wherein the condition flag is defined by the same ordered set only twice in sequence to prevent re-transmission.

5. The method of claim 4, wherein the ordered set that defines the condition flag is characterized by being normally ignored by other ports in the network, except for those ports enabled to recognize the ordered set.

6. The method as in claim 4, wherein the ordered set is not germane with respect to re-initialization of ports in the network under the network protocol.

7. The method of claim 1, wherein the port condition comprises a segment stall condition.

8. The method of claim 7, wherein the second port issues a CLS signal to the first port in response to the segment stall condition.

9. The method of claim 1, wherein the port condition comprises a port busy condition.

10. The method of claim 9, wherein a CLS signal is issued in response to the port busy condition.

11. The method of claim 1, wherein the port condition comprises a user defined condition.

12. The method of claim 1, wherein the condition flag is introduced into the network by a switch to which the ports are operatively coupled.

13. A loop network comprising a plurality of ports communicating with each other in a ring configuration and operating in accordance with a high-speed network protocol, said network configured for flagging a port condition that normally interrupts operations of the network by triggering a re-initialization of each port in the network, said network further comprising:
    a device configured for generating a non-intrusive condition flag in response to said port condition, the condition flag identifying a source of the port condition, the device further configured for sending the non-intrusive condition flag to each of the plurality of ports in the ring configuration to avoid the re-initialization of the plurality of ports in said network,
    wherein the condition flag is recognized by one or more enabled ports and ignored by other ports amongst the plurality of ports, said one or more enabled ports being notified of the source of the port condition from said non-intrusive condition flag.

14. The network as in claim 13, wherein the device is a Fibre Channel switch.

15. A switch in a loop network comprising a plurality of ports communicating with each other in a ring configuration and operating in accordance with a high-speed network protocol, said network configured for flagging a port condition that normally interrupts operations of the network by triggering a re-initialization of each port in the network, said network further comprising:
    means for identifying the port condition associated with one of the plurality of ports; and
    means for generating a non-intrusive condition flag in response to the port condition, the condition flag identifying a source of the port condition, and for sending the non-intrusive condition flag to each of the plurality of ports in the ring configuration to avoid the re-initialization of the plurality of ports in said network,
    wherein the condition flag is recognized by one or more enabled ports and ignored by other ports amongst the plurality of ports, said one or more enabled ports being notified of the source of the port condition from said non-intrusive condition flag.

16. A storage area network (SAN) comprising:
the network of claim 13;
at least one server coupled to one of the first and second ports;
at least one storage device coupled to another one of the first and second ports.

17. The storage area network (SAN) as in claim 16, wherein the network comprises a Fibre Channel network.

18. A method of storage area networking, comprising the steps of:
providing the network of claim 13;
coupling at least one server to one of the first and second ports;
coupling at least one storage device to one of the first and second ports.

19. The method of claim 1, wherein the condition flag is a marker represented by one or more currently-undefined ordered sets under the network protocol.

20. The method of claim 1, wherein said all other ports remain operating without being interrupted by said non-intrusive condition flag.

21. The network of claim 13, wherein the condition flag is a marker represented by one or more currently-undefined ordered sets under the network protocol.

22. The switch of claim 15, wherein the condition flag is a marker represented by one or more currently-undefined ordered sets under the network protocol.

* * * * *